UNITED STATES PATENT OFFICE.

THOMAS A. EDISON, OF LLEWELLYN PARK, WEST ORANGE, NEW JERSEY.

STORAGE BATTERY.

1,299,693.

Specification of Letters Patent.

Patented Apr. 8, 1919.

No Drawing.

Application filed August 10, 1914. Serial No. 856,025.

*To all whom it may concern:*

Be it known that I, THOMAS ALVA EDISON, a citizen of the United States, and a resident of Llewellyn Park, West Orange, in the county of Essex and State of New Jersey, have invented certain new and useful Improvements in Storage Batteries, of which the following is a description.

In prior patents and applications, I have described storage batteries in which an alkaline electrolyte is employed, and in the preferred form of which the positive elements contain alternate layers of hydroxids of nickel and nickel flake and the negative elements contain electrolytically active iron or oxids of iron. My present invention relates to an improved battery of a similar type, and my principal object is to increase the capacity of such a battery by the provision of an improved negative element.

My invention is based on the discovery that the capacity of the negative element can be materially increased by adding tin or a compound of tin, such as tin monoxid or stannous oxid, to the negative electrode. The finely divided iron preferably employed for said electrode may be prepared by reducing an iron compound, such as ferric oxid, by hydrogen in the manner set forth in my U. S. Patents Nos. 727,117 and 727,118, or in my U. S. Patent No. 1,275,232, dated August 13, 1918, or in any other suitable manner. Before the tin monoxid, which is the compound of tin I prefer to employ, is added to the finely divided iron, care should be taken to have the same in a very fine state of division. The finely divided tin monoxid should be very thoroughly mixed with the finely divided iron, which may also have a small percentage of mercury mixed or incorporated therewith as set forth in my U. S. Patent No. 727,117, dated May 5, 1903. The preferred amount of tin monoxid employed by me is about 20 per cent. by weight, or in other words, for each 100 grams of active material in the negative element, the amount of tin monoxid used will be preferably about 20 grams, but the proportion may be varied considerably on either side of this quantity. As low as 10 per cent. of tin monoxid shows considerable improvement in the capacity of the battery. Larger amounts than 20 per cent. of tin monoxid still further improve the output or capacity of the battery, but the employment of tin monoxid very much in excess of 20 per cent. is unfeasible because of the expense of the same. The increase of capacity of a cell of the class in question by reason of the employment of a negative element containing about 20 per cent. of tin monoxid amounts to about 30 per cent. Furthermore, the average voltage of the cell is substantially increased by the employment of the tin monoxid. Although I have observed that the above named results are obtained by my invention, I am not at present able to explain exactly the reason therefor. If desired, exceedingly finely divided tin may be used instead of the tin monoxid, but by reason of the lower cost of the latter, I prefer to use the same. Furthermore, the tin oxid is reduced to metallic tin when the battery is charged.

The electrolytically active material for the negative element after being prepared as described above, is preferably packed in nickel plated steel pockets supported in nickel plated steel plates or frames, such as are shown in my prior Patent No. 700,137, dated May 13, 1902. The active material for the positive element, I prefer to load in nickel plated perforated steel tubes supported in nickel plated steel plates or frames, such as are described in my prior Patents Nos. 896,635 dated August 25, 1908; 940,635 dated November 16, 1909; and 976,792 dated November 22, 1910. The elements or electrodes thus formed are assembled in a suitable container such, for example, as a nickel plated steel can, means being provided to insulate the elements of one polarity from those of the opposite polarity. For the electrolyte I prefer to employ a solution of potassium or sodium hydroxid, to which may be added a small percentage of lithium hydroxid, as disclosed in my prior Patent No. 876,445, dated January 14, 1908. During the charging operation, the active material of the positive elements stores up oxygen and the active material of the negative elements is partially or completely reduced. During discharging the active material of the negative elements is oxidized and the oxygen contents of the active material of the positive elements is decreased. The positive elements may be designated as the depolarizing element.

The expression "ferrous material" as used in the claims is intended to cover both iron and the oxids thereof; and the expression "stannic material" as used in the claims is intended to cover both tin and the oxids thereof.

Having now described my invention, what I claim as new therein and desire to protect by Letters Patent of the United States is as follows:

1. An active element for storage battery electrodes containing a compound of tin in undissolved condition, substantially as described.

2. An active element for storage battery electrodes containing an oxid of tin, substantially as described.

3. An active element for storage battery electrodes containing stannous oxid, substantially as described.

4. An active element for storage battery electrodes containing finely divided ferrous material and a stannic material, substantially as described.

5. An active element for storage battery electrodes containing finely divided ferrous material and an oxid of tin, substantially as described.

6. An active element for storage battery electrodes containing finely divided ferrous material and a small percentage of a stannic material, substantially as described.

7. An active element for storage battery electrodes containing finely divided ferrous material and approximately 20 per cent. of an oxid of tin, substantially as described.

8. An active element for storage battery electrodes containing finely divided ferrous material, mercury, and a stannic material, substantially as described.

9. An active element for storage battery electrodes containing finely divided ferrous material, mercury, and an oxid of tin, substantially as described.

10. An active element for storage battery electrodes containing an intimate mixture of finely divided ferrous material, and a finely divided oxid of tin, substantially as described.

11. In a storage battery, a positive element, a negative element containing finely divided ferrous material having a small amount of a stannic material mixed therewith, and an alkaline electrolyte, substantially as described.

12. In a storage battery, a positive element, a negative element containing finely divided ferrous material having a small amount of an oxid of tin mixed therewith, and an alkaline electrolyte, substantially as described.

13. In a storage battery, a positive element, a negative element containing finely divided ferrous material having a small amount of mercury and a stannic material mixed therewith, and an alkaline electrolyte, substantially as described.

14. In a storage battery, a positive element containing nickel, a negative element containing a mixture of finely divided iron and a stannic material, and an alkaline electrolyte, substantially as described.

15. In a storage battery, a positive element containing nickel, a negative element containing a mixture of finely divided ferrous material and a stannic material, and an alkaline electrolyte, substantially as described.

16. In a storage battery, a positive element containing nickel, a negative element containing a mixture of finely divided ferrous material and an oxid of tin, and an alkaline electrolyte, substantially as described.

17. In a storage battery, a positive element containing nickel, a negative element containing a mixture of finely divided ferrous material, and a small percentage of mercury and a stannic material, and an alkaline electrolyte, substantially as described.

18. In a storage battery, a positive element, a negative element containing a stannic material, and an alkaline electrolyte containing a lithium compound, substantially as described.

19. In a storage battery, a positive element, a negative element containing a mixture of iron and a stannic material, and an alkaline electrolyte containing lithium hydroxid, substantially as described.

20. In a storage battery, a positive element, a negative element containing finely divided ferrous material having a small amount of mercury and a stannic material mixed therewith, and an alkaline electrolyte containing lithium hydroxid, substantially as described.

21. In a storage battery, a positive element containing nickel, a negative element containing a mixture of finely divided iron and a stannic material, and an alkaline electrolyte containing lithium hydroxid, substantially as described.

22. In a storage battery, a positive element containing nickel, a negative element containing a mixture of finely divided ferrous material, and a small percentage of mercury and a stannic material, and an alkaline electrolyte containing lithium hydroxid, substantially as described.

23. An active element for storage battery electrodes containing a compound of tin in undissolved condition and mercury, substantially as described.

24. An active element for storage battery electrodes containing an oxid of tin and mercury, substantially as described.

25. An active element for storage battery electrodes containing stannous oxid and mercury, substantially as described.

26. An active element for storage battery electrodes containing a stannic material and mercury, substantially as described.

27. An active element for storage battery electrodes containing mercury and a compound of tin, substantially as described.

28. In a storage battery, a positive element containing nickel, a negative element containing finely divided iron having a small amount of mercury and a stannic material mixed therewith, and an alkaline electrolyte containing lithium hydroxid, substantially as described.

This specification signed and witnessed this 6th day of August, 1914.

THOS. A. EDISON.

Witnesses:
FREDERICK BACHMANN,
MARY J. LAIDLAW.

It is hereby certified that in Letters Patent No. 1,299,693, granted April 8, 1919, upon the application of Thomas A. Edison, of Llewellyn Park, West Orange, New Jersey, for an improvement in "Storage Batteries," an error appears in the printed specification requiring correction as follows: Page 1, line 85, for patent number "896,635;" read *896,812;* and that the said Letters Patent should be read with this correction therein that the same may conform to the record of the case in the Patent Office.

Signed and sealed this 5th day of August, A. D., 1919.

[SEAL.]

R. F. WHITEHEAD,
*Acting Commissioner of Patents.*